United States Patent

[11] 3,568,047

[72] Inventors David C. Look;
Donald R. Locker, Dayton, Ohio
[21] Appl. No. 807,836
[22] Filed Mar. 17, 1969
[45] Patented Mar. 2, 1971
[73] Assignee the United States of America, as represented by the Secretary of the Air Force

[54] APPARATUS AND METHOD FOR MEASURING NUCLEAR SPIN-LATTICE RELAXATION TIME ($T_1$) BY TONE-BURST MODULATION
5 Claims, 2 Drawing Figs.

[52] U.S. Cl. .................................................. 324/0.5
[51] Int. Cl. ................................................... G01n 27/78
[50] Field of Search ....................................... 324/0.5 (Lit)

[56] References Cited
OTHER REFERENCES

L. Malling - Field Pulses Produce Nuclear Spin Echoes - Electronics - June 1954 - pp. 134—137.

S. Meiboom & D. Gill - Modified Spin Echo Method for Measuring Nuclear Relaxation Times - Rev. of Scientific Instruments - 29(8) - Aug. 1958 - pp. 688—691.

Primary Examiner—Michael J. Lynch
Attorneys—Harry A. Herbert, Jr. and James S. Shannon ABSTRACT: The static field of an NMR spectrometer is modulated by a series of repeated tone bursts of an audio wave of triangular or sinusoidal form with the bursts separated by periods of at least four times the spin-lattice relaxation time $T_1$. The static field has a value such that the superimposed modulation causes field strength excursions equal distances above and below the magnetic resonance value. The spectrometer output signals produced by the passages through the resonance value are displayed by an oscilloscope having its horizontal sweep synchronized with the start of each tone burst. The value of $T_1$ is calculated from measurements made on the recorded oscilloscope display.

APPARATUS AND METHOD FOR MEASURING NUCLEAR SPIN-LATTICE RELAXATION TIME (T₁) BY TONE-BURST MODULATION

BACKGROUND OF THE INVENTION

This invention relates to NMR (nuclear magnetic resonance) and particularly to the measurement of nuclear spin-lattice relaxation times in liquids and solids using continuous wave NMR spectroscopy.

In studying the properties of matter, such as the electrical properties of semiconductors for example, useful information is provided by the nuclear spin-lattice relaxation time, i.e., the time constant $T_1$ of the exponential function in accordance with which a sample in a strong static magnetic field approaches a state of thermal equilibrium between the nuclear spin system and the lattice. The relaxation process is represented by the equation $$M(t) = M_s + [M_0 - M_s]\left(1 - e^{\frac{-t}{T_1}}\right) \qquad (1)$$

where $M(t)$ = the magnetic moment of the sample at time $t$,
$M_s$ = the magnetic moment at the start of relaxation which may be zero, and
$M_0$ = the magnetic moment at equilibrium.
Thus, at $t = o$, $M(t) = M_s$; and at $t = \infty$, $M(t) = M_0$.

Continuous wave spectroscopy is used primarily for lineshape studies although relaxation investigations are sometimes carried out, usually by one of three methods: (1) a direct method in which the recovery of the signal is observed in a weak RF field $H_1$, after saturation in a strong $H_1$; (2) a progressive saturation method in which the steady state signal is measured as a function of RF field strength; and (3) a transient method, in which the spin system is saturated at resonance, quickly moved off resonance for a time $t$, and then swept back through the resonance to observe the magnetization recovery in time $t$. Method (1) has the disadvantage that the relaxation is occurring in the presence of $H_1$, requiring a correction factor; also $H_1$ must be switched from a high to a low value. Method (2) requires an accurate measurement of $H_1$ and is only useful for simple line shapes, either Lorentzian or Gaussian. Method (3) is excellent for long relaxation times (10 seconds or greater) where the spin system is easily saturated, but is not readily adaptable to measure shorter times. An existing method which gives reliable results for both long and short relaxation times is the pulsed NMR technique; however, this method requires a different spectrometer and usually is less sensitive to weak-signaled spin systems.

SUMMARY OF THE INVENTION

The method of measuring $T_1$ to be described and which constitutes the invention can be practiced with a standard continuous wave NMR spectrometer with a minimum of modification and added equipment. Briefly, the modification consists in adding a tone-burst generator in combination with a triangular (or sinusoidal) wave generator to provide a series of audio frequency tone bursts to the DC magnetic field modulating coils of the NMR spectrometer. The tone bursts contain equal numbers of the cycles of the audio wave and are separated by intervals of at least $4T_1$. The DC field is set at a value sufficiently below the nuclear magnetic resonance value that the superimposed modulation carries the field to a point equally above the resonance value and back to the set value in each cycle of the modulating wave, the field passing twice through the resonance value in each cycle. The spectrometer signals resulting from the passages through the resonance value decrease in magnitude exponentially and are displayed on an oscilloscope having a linear horizontal sweep synchronized with the start of each tone burst. The value of $T_1$ is calculated from measurements made on the recorded oscilloscope display. The calculation can be made from the record of a single tone burst; however, where signal enhancement is needed, automatic, unattended operation is possible over a large number of tone bursts using a time-averaging computer, a repetitive-scan storage oscilloscope, or other suitable device to sum the signals produced by each tone burst.

DETAILED DESCRIPTION OF THE INVENTION

Figure 1:
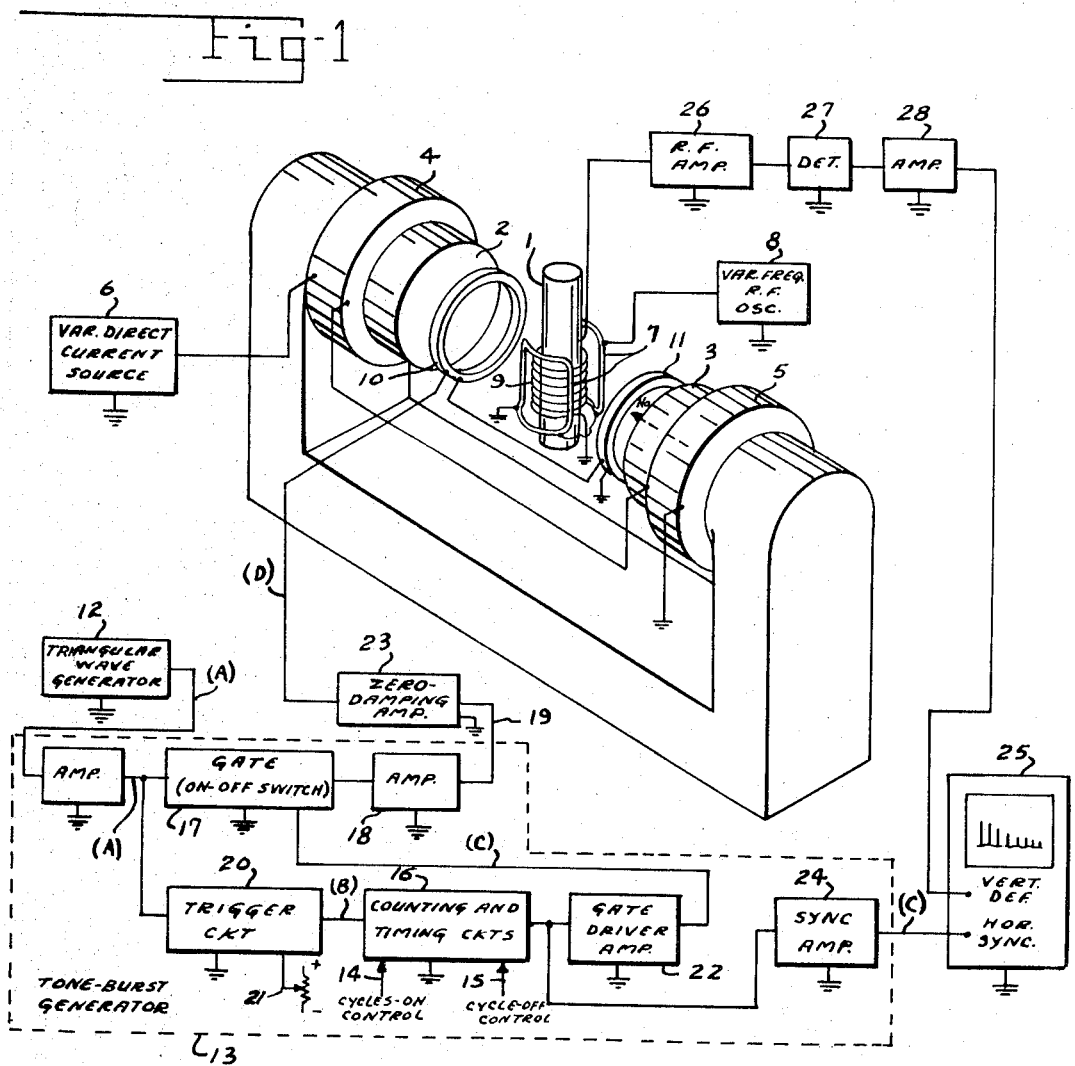
FIG. 1 shows a NMR spectrometer arranged for spin-lattice relaxation measurement in accordance with the invention.

Referring to FIG. 1, the standard continuous wave NMR spectrometer employed in relaxation measurements in accordance with the invention will be described first. The sample to be analyzed is supported by a suitable sample holder 1 in the center of a strong static or DC magnetic field $H_o$ established between the pole faces 2 and 3 of an electromagnet having energizing coils 4 and 5. The magnetizing current is supplied by source 6 and is adjustable so that the field strength can be varied. This field is usually referred to as the polarizing field. Two-section coil 7, energized from variable frequency RF oscillator 8, is provided for the application of a RF magnetic field to the sample. This coil is usually referred to as the transmitting coil. Coil 9, which has the sample at its center, is usually referred to as the receiving coil. The axes of coils 7 and 9 lie in a plane normal to the direction of field $H_o$ and intersect at a point that is preferably at the center of the sample.

A Faraday shield (not shown) is usually provided between coils 7 and 9 to reduce electrostatic coupling to a minimum. Since coils 7 and 9 are at right angles the magnetic coupling between them approaches zero. However, in accordance with standard practice, it is necessary to introduce a certain amount of leakage coupling between the two coils that is controllable in magnitude and phase in order to establish operation of the NMR spectrometer in either the V-mode (absorption mode) or the U-mode (dispersion mode). This is usually accomplished by introducing small highly conductive discs and small shorted resistive loops into the vicinity of the coils by means of paddles, the discs controlling the V-mode component and the resistive loops the U-mode component in the receiving coil 9. Since this is standard practice in NMR spectrometers, the paddles for controlling the leakage coupling are not shown in FIG. 1 in order to simplify the drawing. In practicing the invention, the leakage is preferably adjusted for V-mode or absorption mode operation in which the signal produced in receiving coil 9 peaks at nuclear magnetic resonance.

Finally, the NMR spectrometer is provided with a pair of series-connected coils 10 and 11 concentric with an axis passing through the point of intersection of the axes of coils 7 and 9 and normal to these axes. The purpose of these coils is to modulate the steady field $H_o$ produced by the large electromagnet. In conventional use of the spectrometer, and similarly in its use in the invention, these coils serve to sweep the field back and forth over a small range centered on the resonance value.

The illustration of the NMR spectrometer structure in FIG. 1 is intended to show clearly the component parts and their relation to each other rather than to show an actual construction to scale. Coils 7, 9, 10, and 11 are in actual practice mounted in a single structure called a probe which is adapted to receive the sample holder 1. The probe has a thickness of about 1 inch so that it can be inserted in an only slightly wider airgap between pole faces 2 and 3.

Figure 2:
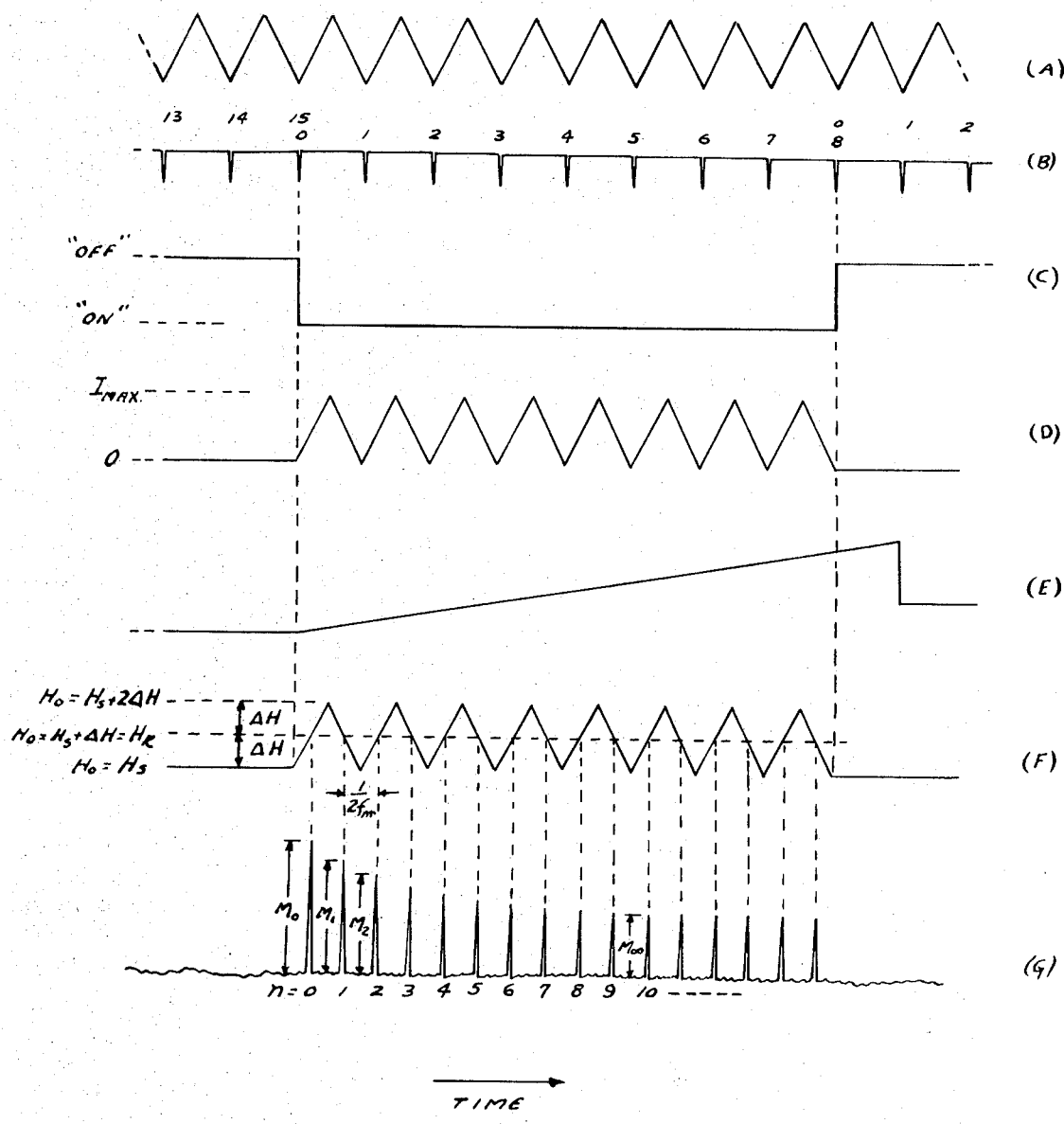
FIG. 2 shows waveforms occurring in FIG. 1.

In order to use a continuous wave NMR spectrometer for the measurement of spin-lattice relaxation times in accordance with the invention, a tone-burst audio frequency modulation is added to the steady magnetic field $H_s$ in the following manner: A triangular waveform generator 12 produces a triangular wave of voltage, such as shown by waveform A of FIG. 2, which is applied as an input signal to tone-burst generator 13. The tone-burst generator acts to alternately pass the input wave for a specified number of its cycles and to block passage of the wave for a predetermined number of its cycles, depending upon the setting of the cycles-on control 14 and the cycles-off control 15, respectively, of the counting and timing circuits 16. The alternate passing and blocking of the wave A is accomplished by gate 17 which acts as an on-off switch. When switch 17 is "on," wave A is passed through the switch and output amplifier 18 to the output circuit 19 of the tone-burst generator; when "off" there is no output from the tone-burst generator. The counting and timing circuits 16 are synchronized with the wave A by trigger pulses derived from this wave by trigger circuit 20 and shown in waveform B of FIG. 2. By means of trigger level control 21 of circuit 20, the trigger pulses can be made to occur at any selected voltage of wave A. For purposes of the invention, this control is preferably set for trigger pulses to occur at the lowest value of wave A, as shown in FIG. 2. The operation of gate or switch 17 is controlled by a gate pulse generated by circuit 16 and shown, after amplification and inversion in gate driver amplifier 22, by waveform C of FIG. 2. In the specific example shown, it is seen that eight full cycles of wave A are allowed to pass and 15 cycles are blocked from passage. The resulting 8-cycle tone burst is applied to the input of zero-damping amplifier 23 which drives the modulating coils 10 and 11. The design of the amplifier is such that the current through the modulating coils is proportional to the amplifier input voltage. The zero point of the output of amplifier 23 is so adjusted that the current through coils 10 and 11 flows in only one direction, or, in other words, varies between zero and a maximum value of one sign as shown by waveform D of FIG. 2. Therefore, if the field produced by $I_{max}$ flowing in coils 10 and 11 has a value $2\gamma H$ and the steady field $H_s$ is adjusted at source 6 to have a value $H_s=H_R-\Delta$ where $H_R$ is the resonance value of $H_o$, then $H_o$ increases from $H_s$ through $H_R$ to the value $H_s+2\Delta H$ and decreases from this value through $H_R$ to the starting value $H_s$ in each cycle of the tone burst, as shown by waveform F in FIG. 2. As a result the field passes through $H_R$ twice in each cycle of the tone burst and these passages are separated equally in time by the interval $1/2f_m$.

The tone-burst generator 13 also provides means for synchronizing the horizontal sweep of an oscilloscope with the tone burst. For this purpose the output pulse of circuit 16 is also applied to a synchronizing signal amplifier 24 the output of which is of the same waveform as the gate pulse output of amplifier 22 and therefore may also be represented by waveform C of FIG. 2. This pulse is applied to the horizontal synchronizing signal input of oscilloscope 25 and causes its horizontal sweep to be initiated in coincidence with the leading negative-going edge of the pulse, and therefore in coincidence with the start of the tone burst, as shown by waveform E of FIG. 2.

Tone-burst generators such as that shown in block form in FIG. 1 are well known in the art and available commercially. An example is the General Radio, Type 1396-B, Tone-Burst Generator.

The operation of the apparatus of FIG. 1 and the manner of using the apparatus to derive the spin-lattice relaxation time $T_1$ of a sample are as follows:

As is known in the NMR art and as described in the literature on the subject, for example, Nuclear Magnetic Resonance by E. R. Andrew, Cambridge University Press, 1958, nuclear magnetic resonance occurs in the sample when the angular velocity of the RF energization applied to the transmitting coil, and therefore the angular velocity $\omega_1$ of the RF field $H_1$ produced by this energization, equals the angular velocity $\omega_o$ of the precession of the vector representing the magnetic moment of the sample about the direction of the polarizing magnetic field $H_o$ in which the sample is immersed. The angular velocity $\omega_o$ of the precessing vector is given by the relation $$\omega_o = \gamma H_o \quad (2)$$

where $H_o$ is the strength of the polarizing magnetic field and $\gamma$ is the gyromagnetic ratio, or the ratio of the magnetic moment of the nucleus to its spin moment. Thus, resonance occurs when $\omega_1$ of the RF energization of coil 7 equals $\omega_o$.

The precessing magnetic moment of the sample induces a voltage in receiving coil 9 which is small for nonresonant conditions but increases rapidly as $\omega_1$ approaches $\omega_o$, and, for V-mode operation, attains a peak value at $\omega_1=\omega_o$. It is the usual practice, and the practice in this case, to hold $\omega_1$ of the RF field constant at a suitable value and vary the polarizing field $H_o$ to achieve the resonant condition, as indicated by peak output from receiving coil 9, at $$H_0 = \frac{\omega_1}{\gamma}.$$

In order to display the output of the NMR spectrometer on the screen of oscilloscope 25, the RF voltage induced in receiving coil 9 is first amplified by a suitable RF amplifier 26, rectified in detector 27, and, after further amplification of the detected signal in amplifier 28, applied to the vertical deflection circuit of the oscilloscope.

Assuming, with reference to the modulated polarizing field waveform F of FIG. 2, that $$H_0 = \frac{\omega_1}{\gamma} = H_R$$

the resonance value of the polarizing field, the NMR spectrometer is swept through the resonant condition sixteen times during each 8-cycle tone burst applied to modulating coils 10 and 11. The resulting spectrometer output signal during the tone burst, as displayed on the oscilloscope, is illustrated by waveform G of FIG. 2.

As seen from waveform G, the first resonant peak, occuring at $n=0$, has the maximum magnitude and the subsequent peaks decline exponentially in magnitude $T_a$ minimum value is reached at $n=9$ or 10 in the illustrated example. The reason for this is as follows: As stated earlier the interval between tone bursts is made at least as long as $4T_1$ so that the sample has sufficient time during this interval to reach substantially a state of thermal equilibrium between the nuclear spin system and the lattice in the presence of the off-resonance value $H_s$ of the polarizing field $H_o$ and the presence of the RF field $H_1$. In this relaxed state of the sample, the maximum number of nuclear magnetic moments have components lying in the direction of the polarizing field $H_o$. During resonance the effect of the RF field $H_1$ is to rotate a number of the nuclear moments 90° into the plane of the axes of coils 7 and 9. Since the number rotated depends upon a probability of such rotation taking place, the maximum number are rotated when the maximum number of nuclei have their moments aligned with $H_o$. Therefore, the maximum number are rotated at the first pass through resonance after a state of equilibrium has been attained, and, since the rotated moments are responsible for the increase in the signal induced in coil 9 at resonance, the maximum output signal occurs at this time. In the interval $1/2f_m$ between resonances some spin-lattice relaxation occurs but there is insufficient time for all the moments rotated to return to alignment with $H_o$. Therefore, at the second pass through resonance, the number of moments in alignment with $H_o$ is less than at the first pass so that, with the same probability, fewer are rotated and the output signal is less. It should be stated at this point that those rotated at resonance quickly lose their phase coherence in the interval between resonances due to spin-spin relaxation and contribute no signal at the succeeding resonance. The output signal continues to decline in the above manner until, at about the 9th or 10th pass through resonance in the example illustrated by waveform G, the number of moments returning to alignment with $H_o$ during the interval between resonances equals the number rotated from alignment, with the result that the population of aligned moments remains constant for subsequent passes and the output signal stabilizes at a minimum value.

Since $T_1$ is not likely to be known, an adequately long interval between tone bursts, or "off" interval, can be determined experimentally by noting the value $M_o$ of the first resonance following an interval obviously long enough for the sample to attain spin-lattice equilibrium and reducing this interval until a smaller value of $M_o$ is obtained. An interval slightly larger than the value at which a reduced $M_o$ is first noted may then be set into the tone-burst generator 13.

The tracing shown as waveform G in FIG. 2 is a copy of one actually obtained in the process of measuring the value of $T_1$ for the $F^{19}$ in a CaF crystal by the described method. The parameters in this case were:

$$\frac{\omega_0}{2\pi} = 10 MHz$$

$H_1 = 0.30G$; $2\Delta H = 50G$; $f_m = 30 H_z$; and $H_s = 10,900G$. The value of $T_1$, computed in the manner described below, was 0.12 seconds. With an "off" time of 15 cycles in FIG. 2 and a triangular wave period of 1/30 second, the "off" time is .50 seconds, which is slightly more than the $4T_1$ interval required.

In order to compute $T_1$ from the recorded display on the oscilloscope, of which waveform G of FIG. 2 is an example, the following steps are carried out:

1. A plot of $\log_e (M_n - M)$ vs. $n$ is made on log paper, the highest value of $n$ being that at which the minimum output signal, designated $M\infty,\infty$, is first attained. The values of $M$ are measured directly from the recorded display. The best straight line is drawn through the plotted points and its intercept $I$ at $n=0$ is measured. The slope $S$ of this line is also determined from the graph.

2. The values of $I$ and $S$ determined above, together with the value of $$t = \frac{1}{2f_m},$$

are substituted in the following formula which is solved for $T_1$:

$$\frac{t}{T_1} = \log_e \left[ \frac{1 + M_\infty e^{-I}}{1 + M_\infty e^{-I_e S}} \right] \quad (3)$$

The derivation of the above formula is given in our paper entitled Nuclear Spin-Lattice Relaxation Measurements by Tone-Burst Modulation, appearing in Physical Review Letters, Vol. 20, No. 18, Apr. 29, 1968, page 987—989.

In practicing the above method, in addition to providing a sufficient "off" interval between tone bursts to permit the magnetization of the sample to fully recover, as explained above, the $H_o$ modulating field strength $2\Delta H$ should be much larger than the line width, or width of the resonance curve, $\delta H$; the combination of RF field strength $H_1$ and modulating frequency $f_m$ are so adjusted as to lead to a nonadiabatic signal response; and the period of the $H_o$ modulation should be much less than the expected value of $T_1$. The three conditions may be expressed as follows:

$2\Delta H >> \delta H$, $4f_m \cdot \Delta H >> \gamma H_1$, and $f_m >> (T_1)^1$ where $\gamma$ is the gyromagnetic ratio.

We claim:

1. Nuclear magnetic resonance apparatus comprising: a transmitting coil and a receiving coil having axes at right angles to each other and intersecting at a point within the confines of each coil; means for supporting a sample to be analyzed substantially at said point of intersection; means for continuously applying radio frequency energy of constant amplitude and frequency to the transmitting coil for subjecting the sample to an alternating radio frequency magnetic field of constant amplitude and frequency directed along the axis of the coil; means for producing in the region of said sample a continuous unidirectional polarizing magnetic field having a direction normal to the plane of said intersecting axes and having a fixed value differing slightly from the value required for nuclear magnetic resonance in said sample at the frequency of said radio frequency field; means operative during the "on" periods of a series of alternate "on" and "off" periods for superimposing on said fixed polarizing field and in alignment therewith a relatively weak additional unidirectional field alternating between maximum and minimum values in accordance with a symmetrical nonrectangular modulating wave the period of which is very much less than the time required for the sample to obtain spin-lattice equilibrium, said additional field being of such magnitude and polarity that the resulting total polarizing field has an alternating component centered on said resonance value; a recorder having a constant velocity sweep for recording the amplitude of a signal as a function of time; means for initiating the start of the recorder sweep at the beginning of each "on" period; and means coupled to said receiving coil for producing a signal proportional to the amplitude of the voltage induced in the coil by the precessing magnetic moment of the sample and for applying the signal to said recorder.

2. Apparatus as claimed in claim 1 in which the phase of the leakage coupling between the transmitting coil and the receiving coil is such that the leakage signal in the receiving coil is in phase with the nuclear magnetic resonance signal in this coil so as to provide for operation in the absorption mode.

3. Apparatus as claimed in claim 2 in which the length of the "on" period is sufficient to include as many cycles of said modulating wave as necessary to achieve a stable minimum amplitude in the signal applied to the recorder and the length of the "off" period is sufficient for substantially complete spin-lattice equilibrium to be attained in the sample in the presence of said fixed polarizing field and said ratio frequency field.

4. Apparatus as claimed in claim 3 in which the waveform of said modulating wave is triangular.

5. Apparatus as claimed in claim 1 in which the minimum value of said additional field is zero.